No. 689,908.   Patented Dec. 31, 1901.
W. G. PRICE.
BRAKE FOR VEHICLES.
(Application filed Jan. 11, 1901.)
(No Model.)   2 Sheets—Sheet 1.
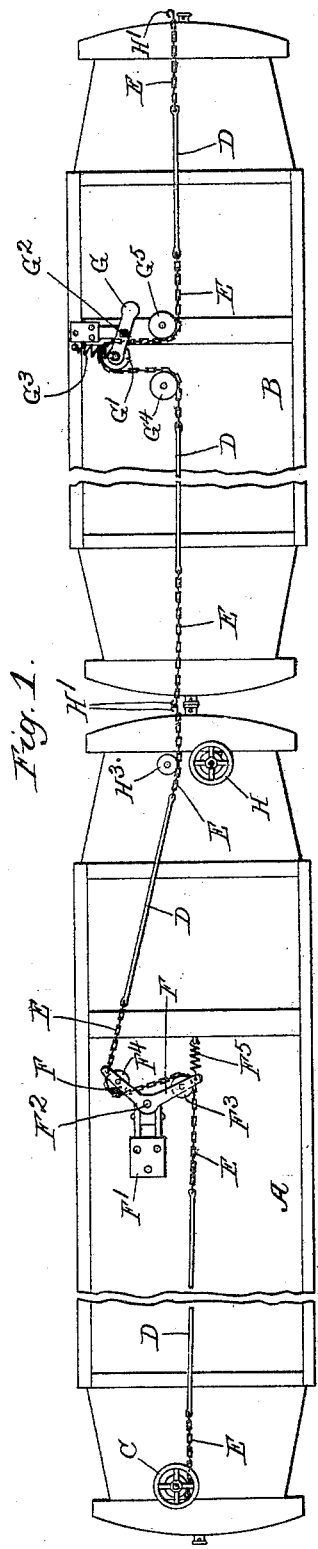
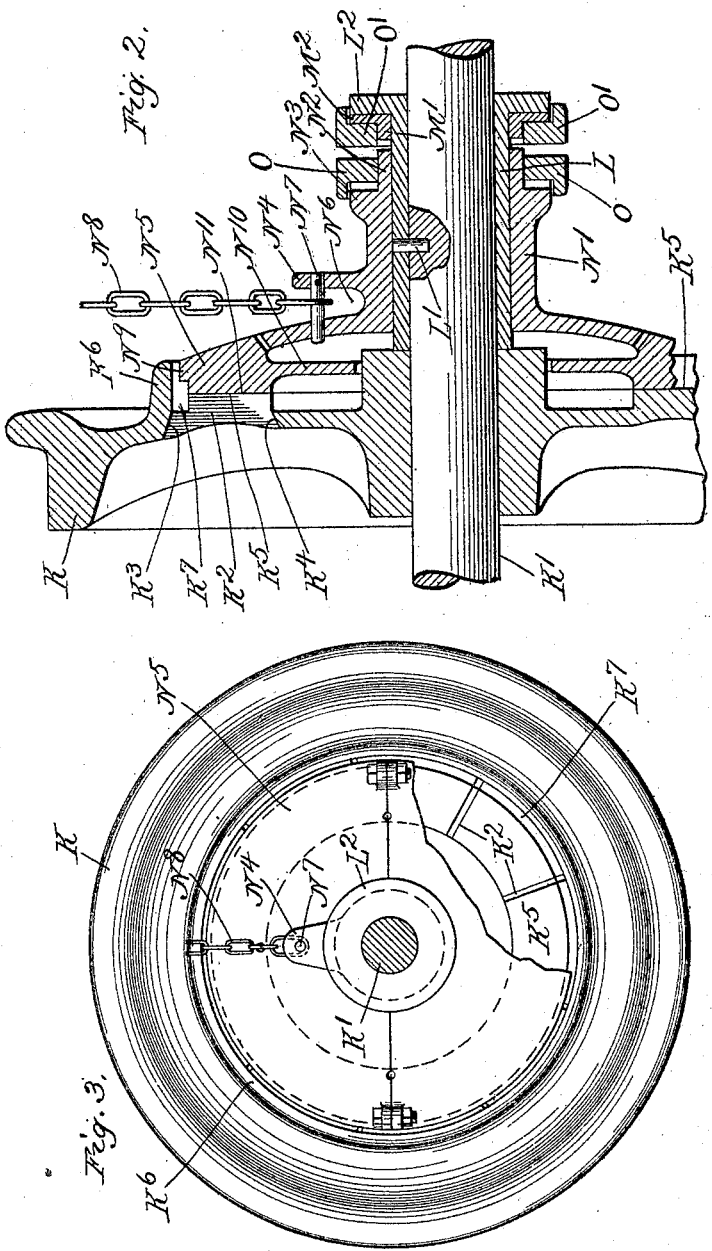
Witnesses.   Inventor.
Edward T. Wray.   William G. Price
Homer L. Kraft   by Parker Carter
   his Atty's.

No. 689,908. Patented Dec. 31, 1901.
W. G. PRICE.
BRAKE FOR VEHICLES.
(Application filed Jan. 11, 1901.)
(No Model.) 2 Sheets—Sheet 2.

UNITED STATES PATENT OFFICE.

WILLIAM G. PRICE, OF KINGSTON, NEW YORK, ASSIGNOR TO COLUMBIA BRAKE & SUPPLY COMPANY, OF CHICAGO, ILLINOIS, A CORPORATION OF ILLINOIS.

BRAKE FOR VEHICLES.

SPECIFICATION forming part of Letters Patent No. 689,908, dated December 31, 1901.

Application filed January 11, 1901. Serial No. 42,842. (No model.)

*To all whom it may concern:*

Be it known that I, WILLIAM G. PRICE, a citizen of the United States, residing at Kingston, in the county of Ulster and State of New York, have invented a certain new and useful Improvement in Brakes for Vehicles, of which the following is a specification.

My invention relates to vehicle-brakes, particularly such as are adapted for use in connection with electric cars, and relates, among other things, to means for operating and controlling brakes in trailer-cars from the motor car and devices in connection with the friction-plates which operate to apply the brakes.

My invention is illustrated in the accompanying drawings, wherein—

Figure 4:
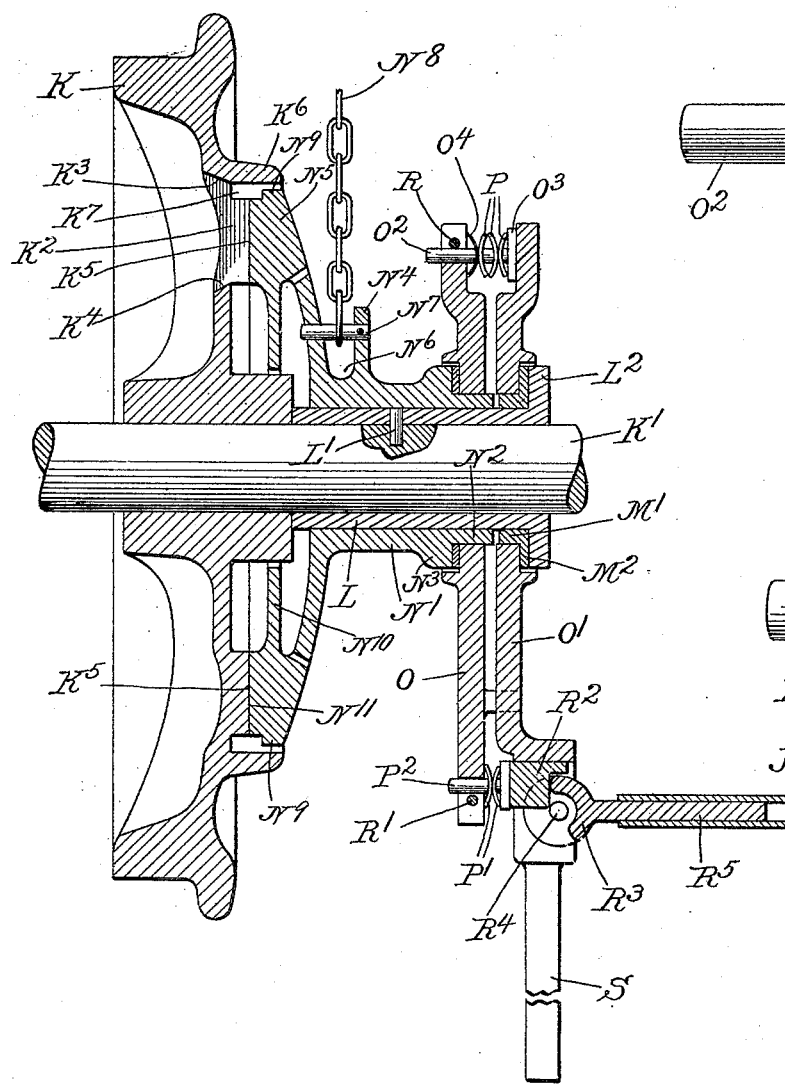
Figure 5:
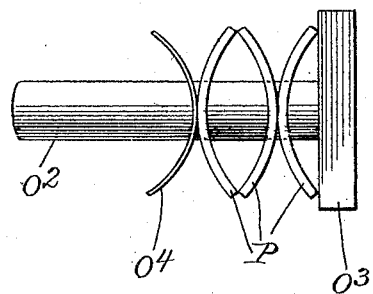
Figure 6:
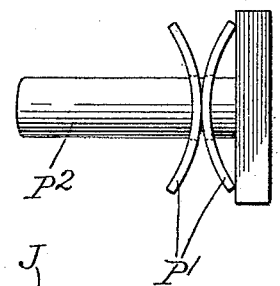

Figure 1 is a diagrammatic plan view of a motor-car and trailer with the parts diagrammatically shown. Fig. 2 is a cross-section through the friction-plate and wheel. Fig. 3 is a side elevation of the friction-plate and wheel and connected parts. Fig. 4 is a section through the device, showing the spring tension apparatus. Figs. 5 and 6 are details of the tension-springs.

Like parts are indicated by the same letter in all the figures.

A is the motor-car; B, the trailer; C, the brake-wheel.

D D and E E represent a series of chains or ropes and rods whereby the several brake-controlling devices can be connected from the motor to the trailer.

F is a cross-arm supported on a bracket F' and so as to swing on the axis $F^2$ and carrying the sheaves $F^3$ $F^4$, over which runs the chain E.

$F^5$ is a spring attached to one end of the cross-arm and tending to pull it into a position which will be called its "brake-setting" position.

G is a somewhat similar arm having one sheave G', over which travels a chain E and supported so as to swing at $G^2$. $G^3$ is a spring which keeps this cross-arm in a brake-setting position.

$G^4$ and $G^5$ are sheaves fixed on the trailer over which runs one of the chains E.

H is a brake-wheel on the shaft of which the chain E, at the end of the motor, is adapted to wind when the trailer is not in use.

H' H' are hooks on the chains whereby they may be hooked together from car to car or attached to the brake-shaft or fixedly attached to the end of the car.

$H^3$ is an idler-sheave.

J $R^5$ are the two parts of a telescopic device, the upper portion being attached to the cross-arm F and the lower portion being connected with the levers which operate the friction-disk. These telescopic parts are made so as to slide upon each other longitudinally, but to rotate together, and the upper part J is attached in any desired manner to cross-arm F, so that when the arm is moved the part J is rotated and the part $R^5$ rotated therewith. These parts are shown in another application of mine, and therefore I do not show them more in detail here, as they do not form a necessary part of the present invention.

K is a car-wheel, which I will broadly indicate as a "fixed disk" and which is fixedly attached to the axle K'. It is provided with a series of radial slots $K^2$, each having the outwardly-inclined end $K^3$ and the inwardly-inclined end $K^4$.

$K^5$ is a raised annular friction-surface on one side of the wheel.

$K^6$ is a flange about the friction-surface, and $K^7$ is a groove between the flange and the friction-surface.

L is a sleeve fixed on the axle—as, for example, by means of the dowel-pin L'. It abuts against the car-wheel and on the opposite end has the upwardly-turned flange $L^2$.

O' is a lever adapted to rest and bear upon a split brass ring, which is composed of the sleeve-encircling part M' and the bearing flange-like portion $M^2$.

O is an associated lever, which in like manner rests upon the split sleeve N'. This sleeve has the thimble-like part $N^2$ and the flange-like part $N^3$ to furnish a proper bearing for the lever O. This sleeve has the upwardly-projecting lug $N^4$ and the central outwardly-projecting disk-like part $N^5$. Between these two parts is formed the groove $N^6$, across which projects the pin $N^7$, and to which a brake-setting chain N⁸ is attached. The disk N⁵ is provided with an upwardly-projecting rim N⁹, which closely approaches the inner surface of the flange K⁶ and overhangs the groove K⁷.

N¹⁰ is a downwardly-projecting flange which closely approaches the hub of the wheel.

N¹¹ is an annular friction-surface on the disk N⁵, and it is opposed to the friction-surface K⁵, which is also annular. These two annular surfaces are approximately the same in radial cross-section.

It will be understood that the brake-chain N⁸ extends to the brake-beam or in any other manner is applied so as to set the brakes, and I have not thought it necessary to show this part of the device, because any of the familiar constructions can be used.

The sleeve N' and the disk N⁵ are not integral and form a split two-part portion. These two parts are attached together in any desired manner. The brass ring M' M² is also a split ring. I have not shown the means for attaching the two parts of each of these devices together, as any of the numerous familiar constructions can be employed. The distance from the outer end of the sleeve N' to the flange L² is substantially equal to the distance from the friction-surfaces N¹¹ K⁵ to the outer end of the flange K⁶, so that when the brass ring is removed the sleeve N' and the disk N⁵ can be removed outwardly and the two parts separated and removed from the fixed sleeve on the axle.

The telescopic device is connected by means of a cam R³ with the transverse pin P², which is rigidly connected with one lever and passes loosely through the other. The two levers are pivoted together. Thus when the cam is operated the pin is pushed inwardly and the two levers are separated from each other.

I will now describe those features of my invention which are peculiar to Figs. 4, 5, and 6. When friction-brakes are used, it is desirable that the chain which is attached to the hub of the friction-disk and extends to the bar-lever should have at all times its slack taken up. This chain is made long enough to allow the truck to swing around corners without applying the brake, so that when the car is on a straight track the chain is about six inches longer than necessary to reach from the bar to the point of fastening on the hub of the friction-disk, and if some means is not provided for keeping this chain wound up the car will have to move farther to apply the brake than it otherwise would. It is also desirable to keep the disk friction-surfaces always together or slightly in contact, for by this means the dust and grit of the street is of course still further prevented from getting between the surfaces which it would abrade. One very serious defect which is common in friction-brakes is their failure to operate in wet weather and during severe storms. This is partly due to the water getting between the friction-surfaces, and thus acting as a sort of lubricant. The above-described features of construction are such as to very greatly obviate these difficulties; but to still further prevent these difficulties and at the same time get rid of the disadvantages incident to the slack-chain I have invented the devices more specifically shown in Figs. 4, 5, and 6. Broadly speaking, these features consist in the use of proper springs in connection with the friction device, which are intended to keep the friction-surfaces slightly in contact, and these are applied or used in connection with the heavier springs, which are a part of the brake mechanism, as illustrated in all the figures. The heavy springs require a pressure of, say, two hundred and fifty pounds to close. They are not under compression when the brake is released, and so far as their action is concerned they are located so that under such conditions the friction-surfaces would be, say, one-sixteenth of an inch apart. The light or delicate spring or springs associated with them require, for example, three-eighths of an inch of movement to close with a pressure of, say, three to five pounds, and they are so related to the rest of the structure that they tend to keep the friction-surfaces in contact, but lightly, so as to prevent the grit and water from getting between those surfaces. The slight friction between these surfaces caused by such pressure of three to five pounds causes the loose disk to wind up all the slack there may be in the chain, and thus a quicker stop can be made than when this light spring is not used. As suggested, I prefer to use two springs, a very stiff one and a very weak one. The stiff one does not act and has no value when the brake is released; but the weak one is entirely too weak to be of any value when the brake is applied, as it is fully compressed with a pressure of five pounds, while it requires a pressure much greater—from fifty to one hundred and fifty or two hundred pounds—to cause the friction-disk to pull the brake-shoes up to the wheels. Another advantage gained from using this light spring, which is always under compression, is that it prevents the different parts of the mechanism from being loose and rattling against each other, and when this light spring is used the several parts do not wear away as rapidly where they touch each other.

O O' are levers which are interposed between the parts N³ and M².

O² is a cylindrical pin with a square head O³. About this pin is the light or delicate spring O⁴, the pressure of which by separating the levers tends to keep the two friction-surfaces lightly pressed together.

P P are heavy springs back of the light spring O⁴ and about the pin O² and so between the levers O O', and they act only when the brake is applied, so as to form a yielding frictional contact. The relation between the heavy and light springs is such that the compression of the light springs produces practically no effect at all on the heavy springs.

Another set of springs at P' may be used about the pin P². The pin O² is held in position by the cross-pin R and the pin P² by the cross-pin R'. These latter springs are opposed to the plunger R², which is moved by the cam R³ on the bolt R⁴, and the telescopic link or connection is indicated at R⁵. A weak spring similar to O⁴ could be used on the pin P², if desired. The square head O³ is made of any desired size, and the springs are preferably in the shape of square pieces approximately the same size as the square head on the pin. The arm S extends to the frame of the truck and supports the clutch-levers to keep them from revolving with the axle in the usual manner.

A good deal of the car mechanism which might be shown has not been illustrated, because it is assumed that the general art is sufficiently well known to obviate the necessity of showing or describing more than the particular parts intended to be covered.

In Fig. 1 the parts specifically shown in Fig. 4 are omitted, because of the difficulty of lettering all the parts in each of the two figures.

The use and operation of my invention are as follows: Referring first to the devices for controlling the brakes, as illustrated in Fig. 1, it will be seen that upon turning the brake-wheel C the cross-arm will be moved on its axis or pivot, for the tendency of the system of ropes, chains, rods, and the like would be to straighten out, and the telescopic device will be rotated on its vertical axis. This will by means of the cam and cross-arm operate the levers in the direction to disengage the friction-surfaces and release the brake. This operation is in opposition to the action of the spring F⁵, which tends to keep the cross-arm in a brake-setting position, or, in other words, in a position where the levers are separated, so as to force the two friction-surfaces together. Since the rope, chain, and rod systems of the trailer and motor are connected together, as indicated, this same action will take place at the same time in the trailer, and thus simultaneously the brakes will be released or set, as the case may be. In this arrangement the brakes are always normally set, and when the transmission system breaks down or the cars are separated or the operator loses control of the brake-wheel the brakes are instantly automatically set on all the cars.

In operating brakes by means of friction-surfaces it has been found extremely difficult to secure uniform and efficient action, because of the tendency of water, vapor, snow, ice, oil, and other materials to get in between and adhere to said friction-surfaces. Obviously in such cases the action of the friction-surfaces would be very materially interfered with. I first provide the flange K⁶ and place in opposition to it the flange-like part N⁹, whereby a water-shedding construction is formed to protect the friction-surfaces. The water coming from the outer surface of the flange K⁶ is carried along and dropped across the opening between the two flanges upon the outer surface of the disk N⁵, and in like manner the water falling upon the outer surface of N⁵ tends to run along down the same and drip off outside of the flange K⁶. Notwithstanding this construction it is found that a considerable quantity of water or other such material is liable to enter between the two flanges, and hence I have provided the groove K⁷ to receive such water. There must, however, be means for drawing off the water and the like from the groove K⁷, and I employ for this purpose the slots K². These are shaped, as shown, so that whatever the position of the wheel with reference to any given quantity of water the tendency of the same is to flow outwardly and away from the friction-surfaces. This is accomplished by the inclined ends K³ K⁴ and by the further fact that the slots K² cross the bottom of the groove K⁷.

To prevent the formation of a groove or the leaving of burs on edges about the friction-surfaces, I have projected the two friction-surfaces from the bodies of those parts with which they are integral. In other words, they are raised annular surfaces. The two friction-surfaces are coincident, so that they wear together, and their thickness is such as to cause them to wear as long as the life of the wheel.

It is clear that many modifications can be made in my device without departing from the spirit of my invention. The overhanging flange and the slots I have shown on the fixed disk. They might be applied to the movable portion, or either of them might be. The flange might be supported from some other portion. The radial slots could be varied in length, size, number, and arrangement, and they might take the shape of holes which would not be properly called "slots." I wish the language used in my claims to be interpreted in this manner, as it is only for convenience that I have used the particular terms to describe the particular construction shown.

The use and operation of the parts illustrated in Figs. 4, 5, and 6 have been sufficiently explained. They coöperate, however, with the features last above referred to to minimize the danger of water, dust, oil, and the like entering between the two friction-surfaces and in this manner coöperate with the previously-described features to produce the general result aimed at in my invention. They also, as previously explained, are effective in taking up the slack of the chain.

I claim—

1. In a vehicle-brake-setting device, the combination of a disk fixed on the axle and provided with a projecting friction-surface integral therewith, with a loose part on the axle provided with an opposed friction-surface, means for bringing the friction-surfaces into operative engagement, means connected with the loose part for setting the brakes, and a flange which overhangs the plane in which the friction-surfaces lie when they are operatively engaged, said flange presenting an outer surface inclined toward the center and toward the outer edge of such flange, the outer extremity of such flange extending so that water and the like dripping therefrom will fall on the back of the loose part which carries the friction-surface.

2. In a vehicle-brake-setting device, the combination of a disk fixed on the axle and provided with a projecting friction-surface, with a loose part on the axle provided with an opposed friction-surface integral therewith, means for bringing the friction-surfaces into operative engagement, means connected with the loose part for setting the brakes and a flange which overhangs the plane in which the friction-surfaces lie when they are operatively engaged, said flange projecting laterally from one of the parts on which one of the friction-surfaces is located, said flange presenting an outer surface inclined toward the center and toward the outer edge of such flange, the outer extremity of such flange extending so that water and the like dripping therefrom will fall on the back of the loose part which carries the friction-surface.

3. In a vehicle-brake-setting device, the combination of a disk fixed on the axle and provided with a friction-surface integral therewith, with a loose part on the axle provided with an opposed friction-surface, means for bringing the friction-surfaces into operative engagement, means connected with the loose part for setting the brakes, a flange which overhangs the plane in which the friction-surfaces lie when they are operatively engaged, said flange projecting laterally from one of the parts on which one of the friction-surfaces is located, and a projecting rim on the part to which the other friction-surface is connected and beneath the flange, said flange presenting an outer surface inclined toward the center and toward the outer edge of such flange, the outer extremity of such flange extending so that water and the like dripping therefrom will fall on the back of the loose part which carries the friction-surface.

4. In a vehicle-brake-setting device, the combination of a disk fixed on the axle and having a laterally-projecting friction-surface integral therewith and a laterally-projecting flange beyond such friction-surface, with a loose part on the axle and provided with an annular laterally-projecting friction-surface to engage the other friction-surface, said flange presenting an outer surface inclined toward the center and toward the outer edge of such flange, the outer extremity of such flange extending so that water and the like dripping therefrom will fall on the back of the loose part which carries the friction-surface.

5. In a vehicle-brake-setting device, the combination of a disk fixed on the axle and having a laterally-projecting annular friction-surface integral therewith and a laterally-projecting flange beyond such friction-surface, with a loose part on the axle and provided with an annular laterally-projecting friction-surface to engage the other friction-surface, and a rim which lies under but projects toward said flange, said flange presenting an outer surface inclined toward the center and toward the outer edge of such flange, the outer extremity of such flange extending so that water and the like dripping therefrom will fall on the back of the loose part which carries the friction-surface.

6. In a vehicle-brake-setting device, the combination of a disk-like body fixed on the axle and having a laterally-projecting annular portion carrying a friction-surface, with a loose part on the axle, having also a laterally-projecting annular friction-surface, said friction-surface having the same radial cross-section, and a projecting flange-like part encircling said friction-surface, said flange presenting an outer surface inclined toward the center and toward the outer edge of such flange, the outer extremity of such flange extending so that water and the like dripping therefrom will fall on the back of the loose part which carries the friction-surface.

7. In a vehicle-brake-setting device, the combination of a disk-like part fixed on the axle and provided with a laterally-projecting annular friction-surface, a flange outside of and projecting laterally beyond such friction-surface, and a series of radial slots extending across and entirely through the projecting annular part.

8. In a vehicle-brake-setting device, the combination of a disk-like part fixed on the axle and provided with a laterally-projecting annular friction-surface, a flange outside of and projecting laterally beyond such friction-surface, and a series of radial slots extending across and entirely through the projecting annular part, said slots extending also to the base of the flange.

9. In a vehicle-brake-setting device, the combination of a disk-like part fixed on the axle and provided with a laterally-projecting annular friction-surface, a flange outside of and projecting laterally beyond such friction-surface, and a series of radial slots through the projecting annular part, said slots extending also to the base of the flange and the ends of said slots inclined outwardly and inwardly respectively.

10. In a vehicle-brake-setting device, the combination of a loose part on the axle having a laterally-projecting annular part with a friction-surface, with means for moving said movable part along the axle, and means for setting the brakes when the movable part is moving with the axle, and a fixed disk-like part on the axle provided with a laterally-projecting annular part having a friction-surface, a flange to overhang such friction-surfaces, radial slots through one of the friction-surfaces, and an outwardly-projecting rim under the flange on the other.

11. In a vehicle-brake-setting device, the combination of one fixed and one movable piece on the axle, with engaging friction-surfaces, a connection from the movable part to the brake-beam, so as to set the same, two levers which are adapted to move the movable part along the axle to bring the friction-surfaces into engagement, a removable collar on the axle, a flange rigid on the axle, said two levers adapted to engage one the movable part and the other the removable part, which lies next to said flange.

12. In a vehicle-brake-setting device, the combination of a disk-like part fixed on the axle and provided with an annular friction-surface, an annular flange outside of and projecting laterally beyond such friction-surface, and a series of holes entirely through the disk-like part on the axle whereby material can pass through the disk-like part of the friction-surface on the axle.

13. In a vehicle-brake-setting device, the combination of a friction-disk fixed on the axle and provided with an annular friction-surface, an annular flange outside of and projecting laterally beyond such friction-surface, and a series of holes in the friction-surface which extend entirely through the friction-disk.

14. In a vehicle-brake-setting device, the combination of one fixed part and one removable loose part on the axle, with engaging friction-surfaces, a connection from the removable loose part to the brake-beam so as to set the same, two levers which are adapted to move this removable part along the axle to bring the friction-surfaces into engagement, a removable collar on the axle, a flange rigid on the axle, said two levers carried by reduced portions of the removable loose part and the removable collar, and an overhanging flange on the fixed part.

15. In a vehicle-brake, a fixed disk on an axle, a loose two-part piece which has a disk which is opposed to the fixed disk, an annular flange on the fixed disk, which surrounds the loose disk, a fixed collar on the axle, a loose removable washer on the axle, two levers which are supported by reduced portions of the loose two-part piece and the removable washer.

16. In a vehicle-brake on an axle, a fixed part and a loose part, each having friction-surfaces which are opposed to each other, a fixed collar on an axle, two levers located between the collar and the loose part, with means for forcing them apart, a heavy spring interposed between the levers which acts only when the levers are forced apart, and a light spring interposed between the levers which acts when the brake is released to keep the friction-surfaces lightly in contact.

17. In a vehicle-brake, a heavy spring interposed between the operating-levers, which acts only when the brake is applied, and a light spring interposed between the operating-levers, which acts when the brake is released to keep the brake friction-surfaces lightly in contact.

18. In a vehicle-brake, a strong spring interposed in the operating-levers, which is partially compressed when the brake is applied, and a weak spring interposed in the operating-levers, which is partially compressed when the brake is released and holds the friction-surfaces at all times in contact.

19. In a vehicle-brake, a light spring interposed in the friction device, which acts to keep the friction-surfaces in contact after the brake is released.

20. In a brake for vehicles, a weak spring interposed in the device, which acts to hold the brake friction-surfaces in contact during the time that the brake is released.

21. In a brake for vehicles, a spring interposed in the device, which acts to hold the braking-surfaces in contact during the time the brake is released.

22. In a brake for vehicles, a strong spring and a weak spring interposed in a clutch device, the weak spring being fully compressed and not acting when the brake is applied and to be partially compressed and acting when the brake is released, and the strong spring to be fully extended and not acting when the brake is released.

23. In a vehicle-brake, strong and weak springs interposed in the device, the strong springs to act only when the brake is applied and the weak springs to be fully compressed and not acting when the brake is applied, but always acting to hold the braking-surfaces in contact when the brake is released.

24. In a vehicle-brake-setting device, the combination of one fixed and one movable piece on the axle, with engaging friction-surfaces, a connection from the movable part to the brake-beam, so as to set the same, two levers which are adapted to move the movable part along the axle to bring the friction-surfaces into engagement, a removable collar on the axle, a flange rigid on the axle, said two levers adapted to engage one the movable part and the other the removable part, which lies next to said flange, and an overhanging flange on the fixed portion, which extends as much beyond the plane of engagement of the friction-surfaces as the distance from the end of the movable part to the fixed flange.

WILLIAM G. PRICE.

Witnesses:
JOHN BOSTWICK,
ARTHUR VAN DERBURGH.